United States Patent
Chilakamarri et al.

(10) Patent No.: US 8,706,684 B2
(45) Date of Patent: Apr. 22, 2014

(54) SYSTEM AND METHOD FOR MANAGING ENTERPRISE DATA

(75) Inventors: Srikar Chilakamarri, Hyderabad (IN); Santosh Kumar Mohanty, Mumbai (IN); Kamlesh Mhashilkar, Mumbai (IN)

(73) Assignee: Tata Consultancy Services Limited, Mumbai, Maharashtra (IN)

( * ) Notice: Subject to any disclaimer, the term of this patent is extended or adjusted under 35 U.S.C. 154(b) by 0 days.

(21) Appl. No.: 13/427,035

(22) Filed: Mar. 22, 2012

(65) Prior Publication Data

US 2013/0138603 A1 May 30, 2013

(30) Foreign Application Priority Data

Nov. 30, 2011 (IN) .......................... 3373/MUM/2011

(51) Int. Cl.
*G06F 17/30* (2006.01)

(52) U.S. Cl.
USPC ............................ 707/603; 707/607; 707/609

(58) Field of Classification Search
USPC ............................. 707/609, 999.001, 603, 607
See application file for complete search history.

(56) References Cited

U.S. PATENT DOCUMENTS

| | | | |
|---|---|---|---|
| 2005/0223109 A1* | 10/2005 | Mamou et al. ................ 709/232 |
| 2005/0234969 A1* | 10/2005 | Mamou et al. ................ 707/102 |
| 2006/0117012 A1* | 6/2006 | Rizzolo et al. .................... 707/9 |
| 2008/0033888 A1* | 2/2008 | Flaxer et al. ................ 705/36 R |
| 2009/0157872 A1* | 6/2009 | Pinkston et al. .............. 709/224 |
| 2010/0138251 A1* | 6/2010 | Brown et al. ..................... 705/7 |
| 2010/0250295 A1* | 9/2010 | Channabasavaiah et al. .... 705/7 |

OTHER PUBLICATIONS

Tushar K. Hazra, Building Enterprise Portals: Principles to Practice, ICSE'02, May 19-25, 2002, Orlando, Florida, USA. Copyright 2002 Acm 1-581 13-472-X/02/000, pp. 623-633.*

* cited by examiner

*Primary Examiner* — Shiow-Jy Fan
(74) *Attorney, Agent, or Firm* — Banner & Witcoff, Ltd.

(57) ABSTRACT

A method and a system for managing enterprise data are provided. The system comprises a processor and a memory coupled to the processor. The memory comprises a definition module defining a Data Management Architecture (DMA). Further, the DMA comprises at least one of an enterprise portal, an enterprise model, at least one adaptor, and a set of metrics. The enterprise portal comprises a set of service tools. The set of service tools is configured to perform a set of services on the data. The enterprise model is configured to analyze an enterprise process to create and modify enterprise metadata of the data originating from the enterprise process. Further, the adapter is configured to communicate with a data source associated with the enterprise process for extracting the enterprise metadata from the data source. Furthermore, the set of metrics may represent an analysis of the data.

19 Claims, 11 Drawing Sheets

SYSTEM AND METHOD FOR MANAGING ENTERPRISE DATA

TECHNICAL FIELD

The present subject matter described herein, in general, relates to data management, and more particularly to management of data pertaining to an enterprise.

BACKGROUND

In businesses, such as enterprises, large quantities of data are stored and used in daily business operations. As a result, many situations exist in which data that is stored for one purpose is accessed for another purpose. For example, a company that manufactures and sells products might store manufacturing data related to the products that are produced by the company. The manufacturing data may be used by a sales unit of the enterprise while selling the products. The sales unit may further generate sales data, which may be associated with the manufacturing data. An entity buying the products may also generate buying data associated with the manufacturing data and selling data, thereby generating more and more data. Managing such large quantity of data may be a cumbersome and tedious process.

SUMMARY

This summary is provided to introduce concepts related to systems and methods for managing data of an enterprise and the concepts are further described below in the detailed description. This summary is not intended to identify essential features of the claimed subject matter nor is it intended for use in determining or limiting the scope of the claimed subject matter.

In one implementation, a system for managing enterprise data is provided. The system comprises a processor and a memory coupled to the processor. The memory comprises a definition module defining a Data Management Architecture (DMA). The DMA comprises an enterprise portal comprising a set of service tools, such as a report tool, a configure tool, a define tool, an administrative tool, an analytics and collaborate tool, and a job monitor tool. The set of service tools is configured to perform a set of services on the data. The DMA further comprises an enterprise model for analyzing an enterprise process to create and modify enterprise metadata of the data originating from the enterprise process. Additionally, the DMA further comprises at least one adapter for communicating with a data source associated with the enterprise process for extracting the enterprise metadata from the data source. The DMA further comprises a set of metrics representing an analysis of the data. The memory further comprises a triggering module for triggering the set of service tools.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for managing enterprise data are described herein. An organization or and enterprise may generate a variety of enterprise data, hereinafter interchangeably referred to as data. Examples of the data may include, but are not limited to, payroll data, employee data, employee competency data, billing data, manufacturing data, product data, sales data, purchase data, and the like. In order to manage the data efficiently and effectively, a Data Management Architecture (DMA) may be provided. The DMA facilitates seamless collaboration between a set of service tools by means of enterprise metadata exchange, thereby enabling the set of service tools to perform a set of services under a single portal, i.e., the enterprise portal. Specifically, the DMA comprises an enterprise portal for performing the set of services on the data. The set of services may include a report service, a configure service, a define service, an administrative service, an analytics and collaborate service, and a master data service. In one implementation, the enterprise portal may include the set of service tools to enable a stakeholder to perform one or more services of the set of services in the DMA.

Further, the data in the enterprise may also be analyzed for a variety of purposes. In one example, the data may be analyzed using a set of metrics. The set of metrics is provided for the enterprise to interpret an overall health of the data. The set of metrics is available at any abstract to detail level enabling the stakeholders to analyze the data for various purposes. Further, the set of metrics enable the enterprise to perform a quick evaluation of any new development/enhancement to the DMA.

While aspects of described system and method for managing data of an enterprise may be implemented in any number of different computing systems, environments, and/or configurations, the embodiments are described in the context of the following exemplary system.

Figure 1:
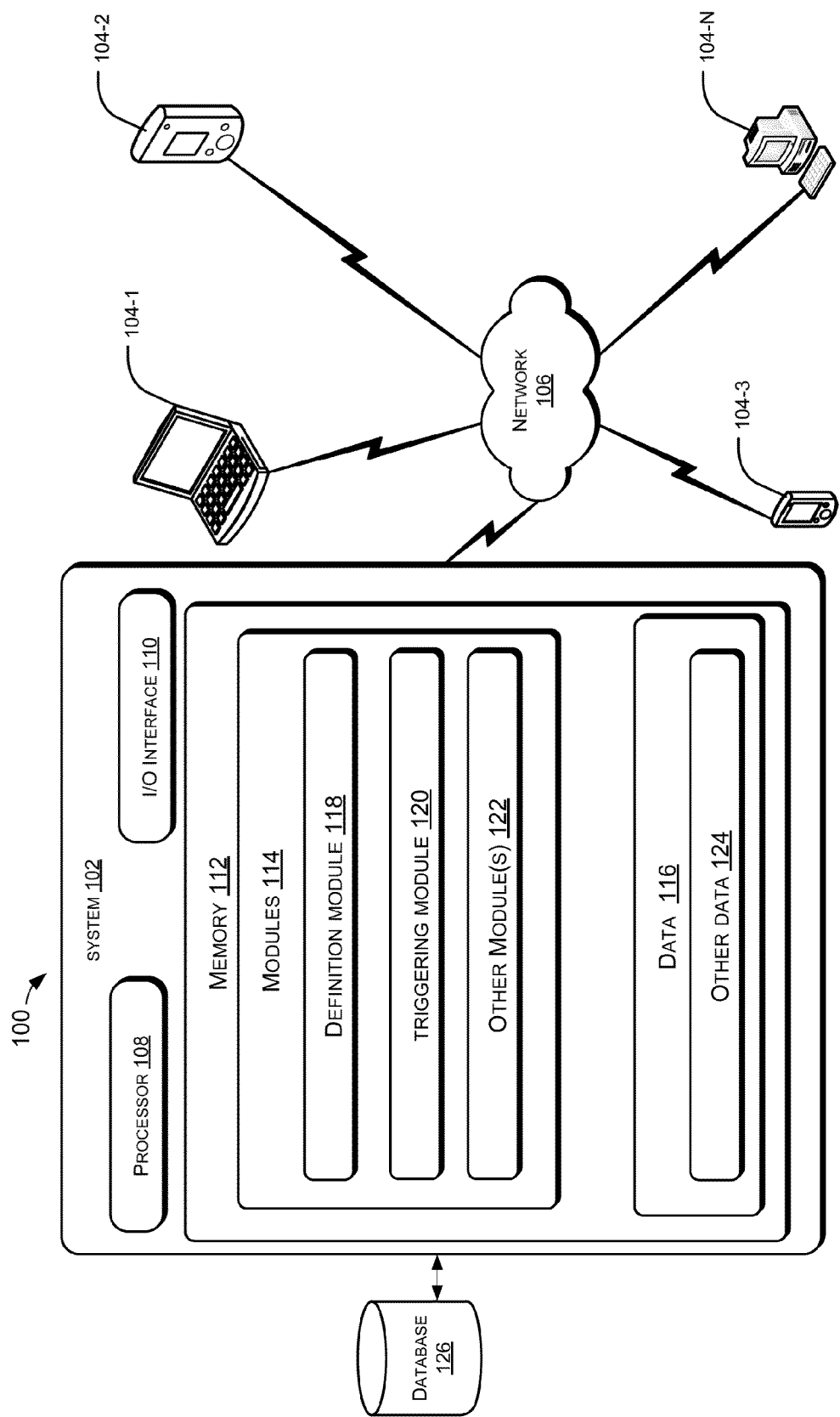
FIG. 1 illustrates a network implementation of a system for managing data of an enterprise, in accordance with an embodiment of the present subject matter.

Referring now to FIG. 1, a network implementation 100 of a system 102 for managing data of an enterprise is illustrated, in accordance with an embodiment of the present subject matter. Further, the system 102 may be implemented in a variety of computing systems, such as a laptop computer, a desktop computer, a notebook, a workstation, a mainframe computer, a server, a network server, and the like. It will be understood that the system 102 may be accessed by stakeholders through one or more client devices 104-1, 104-2, ... 104-N, collectively referred to as client devices 104 hereinafter, or applications residing on client devices 104. Examples of the client devices 104 may include, but are not limited to, a portable computer, a personal digital assistant, a handheld device, and a workstation. The client devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an I/O interface 110, and a memory 112. The at least one processor 108 may be implemented as one or more microprocessors, microcomputers, microcontrollers, digital signal processors, central processing units, state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with a user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 may include modules 114 and data 116.

The modules 114 include routines, programs, objects, components, data structures, etc., which perform particular tasks or implement particular abstract data types. In one implementation, the modules 114 may include a definition module 118, a triggering module 120, and other modules 122. The other modules 122 may include programs or coded instructions that supplement applications and functions of the system 102.

The data 116, amongst other things, serves as a repository for storing data processed, received, and generated by one or more of the modules 114. The data 116 may also include other data 124. The other data 124 may include data generated as a result of the execution of one or more modules in the other module 122.

In one embodiment, the system 102 managing data of an enterprise is provided. Examples of the enterprise may include an IT organization, a product manufacturing organization, a telecommunication organization, or other conglomerates. In one implementation, the system 102 may build and use a Data Management Architecture (DMA) for managing data of the enterprise. The data of the enterprise may be defined as a collection of qualitative description of entities and quantitative measures generated by interaction of one or more entities that enables and executes processes and applications for both internal consumption and external communication. Examples of data may include payroll data, employee data, employee competency data, billing data, manufacturing data, and the like.

In one implementation, the DMA may be stored in a database 126 that is connected to the system 102. Although, in the present embodiment the database 126 is shown to be outside the system 102, in another embodiment, the database 126 may be a part of the system 102.

Figure 2:
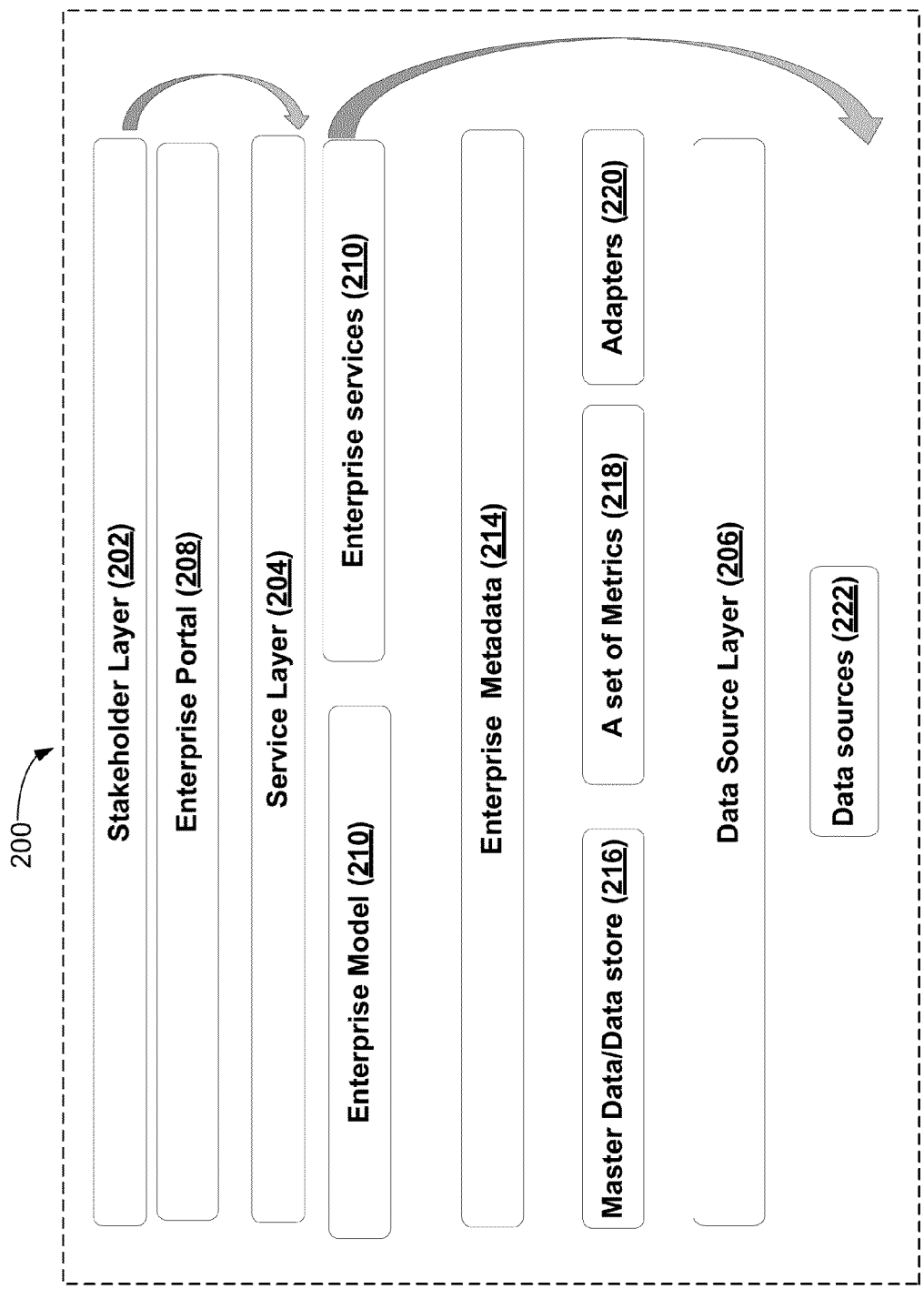
FIG. 2 is a pictorial representation of a Data Management Architecture (DMA), in accordance with an embodiment of the present subject matter.

In the present implementation, the definition module 118 may be configured to define a DMA 200 as shown in FIG. 2. The DMA 200 is based on a principle of 'loosely coupled, tightly integrated' which is described below. The DMA 200 may include a stakeholder layer 202, a service layer 204, and a data source layer 206. The stakeholder layer 202 comprises an enterprise portal 208. The enterprise portal 208 may be understood as a gateway to manage the data of the enterprise. Further, the enterprise portal 208 may comprise a set of service tools to perform a set of services on the data. In one implementation, the service layer 204 may also include an enterprise model 210, enterprise services 212, enterprise metadata 214, master data 216, a set of metrics 218, and adapters 220. Further, the data layer 206 may include data sources 222 present in the enterprise.

In the present implementation, the DMA 200 may include actors and an infrastructure to support the actors. The actors interact with one another by means of meaningful and understandable messages and perform certain activities using the infrastructure. In one example, the actors may include stakeholders, the set of services to be performed by the stakeholders, and the data sources 222. The infrastructure, on the other hand, includes the enterprise model 210, the enterprise services 212, the enterprise metadata 214, the master data 216, and the adapters 220. The infrastructure may also include policies, procedure, hardware, and software to support the actors.

As evident, an enterprise may have many stakeholders. Examples of stakeholders may include consumers, administrators, users, and architects. Each of the stakeholders has a role to perform in a data life cycle. For example, the consumer may consume the data for information, decision making or research. The administrators may define data, control data, manage data definitions and usage, and manage the data life cycle. The users may create, process, and store the data as per guidelines defined. The architects may model and design architectures and interfaces to effectively manage the data. Table 1, as shown below, classifies the stakeholders succinctly.

TABLE 1

Stakeholder classification

| Consumers | Administrators | Users | Architects |
| --- | --- | --- | --- |
| Internal-Business users | Data Administrators/ Custodians | Data Entry operators | Data Architects |
| Executives including CXOs | Process Administrators | Application users | Data Modelers |

TABLE 1-continued

Stakeholder classification

| Consumers | Administrators | Users | Architects |
|---|---|---|---|
| External agencies-Partners, vendors | Data Owners | Developers | Interface Architects |
| Regulatory bodies | Data Stewards | Information processors | Process Architects |
| Knowledge workers | Security officers | Knowledge officers | Designers |

Each of the stakeholders mentioned in Table 1 has a varied degree of privilege to use the set of service tools to perform the set of services. For example, the data analytics and the report service is permitted to be used by a) all consumers shown in Table 1, b) data administrators and custodians, c) developers and information processers, and d) all architects shown in Table 1.

Figure 3:
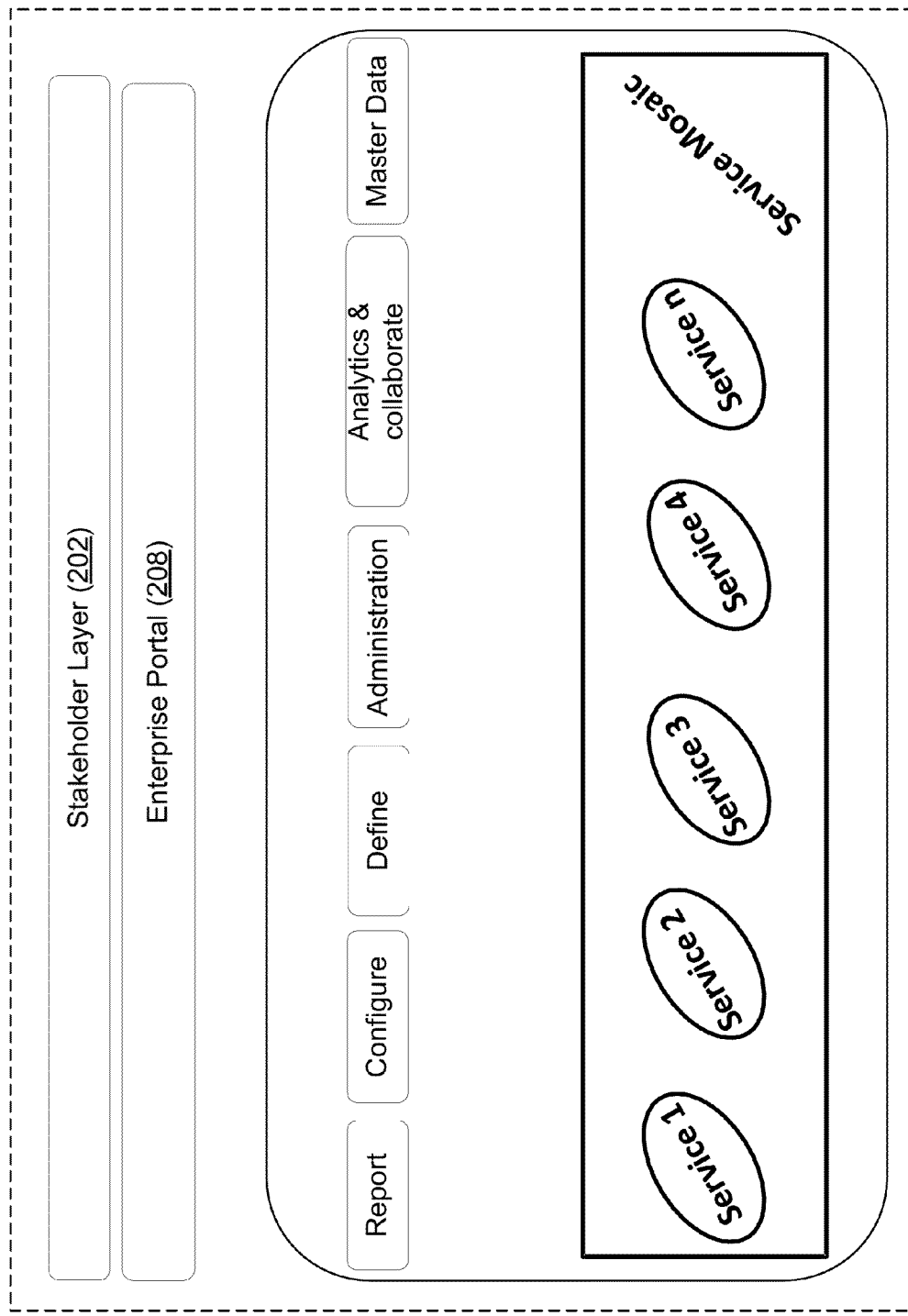
FIG. 3 is a pictorial representation of a set of services, in accordance with an embodiment of the present subject matter.

Referring now to the other actor, i.e., the set of services as shown in FIG. 3, in accordance with an embodiment of the present subject matter. Each service performs one or more functions. The set of services is available to the stakeholders in a packaged manner. The set of services are loosely coupled but tightly integrated using enterprise model 210. In one implementation, the stakeholders are provided access to one or more services of the set of services based on the privileges assigned to the stakeholders. In other words, based upon the privileges assigned, the stakeholders may have restricted access to certain services of the set of services. The set of services may include a report service, a configure service, a define service, an administrative service, an analytics and collaborate service, and a master data service.

The report service is primarily used by the consumers. The consumers have access to all reporting services of the DMA 200 along with access to the service layer 204. The configure service allows the stakeholders to create one or more new services based upon a requirement. The define service facilitates the stakeholders with functions of add, modify, and delete metadata. The administrative service has complete control on the DMA 200. The administrative service is governed by certain privileges and allows certain stakeholders i.e., the administrators to perform any required legitimate function in the DMA 200. The administrative service also allows the stakeholders to create, modify, execute, delete, archive, and backup data in DMA 200. The analytics and collaborate service provides insight of the data and enables search and analysis functions. Primary stakeholders of interest for the analytics and collaborate service are knowledge workers and analysts. Further, the analytics and collaborate service exposes workflows and emails, and trigger services to enable stakeholder to stakeholder and stakeholder to service collaboration. The master data service gathers data from data sources 222 and segregates master data 216 based upon configured libraries and engines. The master data 216 stores a set of standard data models along with certain processing models needed to generate the set of metrics 218.

In one example, for analytics as a service, the report service shall be used to view the data. Reports pertaining to the enterprise metadata, processes, and data quality are made available to the stakeholders. In another example, to perform an analysis on the data, the analytics and collaborate service shall render services of search and triggering workflows for any communication required. In yet another example, the configure service is used to expose each of the other services of set of services of data processing and preparation for the stakeholders to define custom built analytics space. Hence, services can be configured by the stakeholders based on a need.

In one implementation, each service of the set of services is associated with certain rules of execution. To attain an optimized state of the system, each service of the set of services is measured against a set of characteristics. The set of characteristics may include functionality characteristic, performance characteristic, integration characteristic, interoperability characteristic, security characteristic, collaboration characteristic, and adaptability characteristic. The functionality characteristic requires that each service of the set of services provides all features it has been designed for. For example, the master data service may seamlessly communicate with the data sources 222 and may interpret responses from the data sources 222. In case of deviations, the master data service handles all kind of exceptions effectively without user intervention. Further, the functionality characteristic requires that defined rules for a service are robust enough to perform tasks without any vulnerable/missed functions. The performance characteristic requires that a service provides responses or results to a stakeholder within a defined stipulated time. Further, components of each of the services are designed effectively considering functional, non functional, and technical factors to attain an optimum performance level.

The integration characteristic requires that each service integrates in any given architecture seamlessly. Further, components of each service should have a capability to enable plug and play concept. The interoperability characteristic requires that each service works in cohesion with other services in the set of services. Further, the interoperability characteristic also requires an extensive collaboration between the components of the set of services, and between other services and external sources/services. The set of services is made technology agnostic by providing Application Programming Interfaces (APIs) for collaboration with other services in an ecosystem of the enterprise. Further, the security characteristic requires that each service adheres to security policies defined in the enterprise and provides features of masking, encryption, and secured access. The collaboration characteristic requires that each service supports seamless and complete collaboration between the stakeholders and the set of services. The collaboration is supported by workflows, instant messaging, and through interaction devices. The adaptable characteristic requires that each service is componentized to a lowest possible level. Further, in creation of a workflow, each service can be configured only for the components required to suit a job requirement.

In one example, for analysis service, the DMA 200 supports the stakeholder defined processes by integrating one or many services. The stakeholders define rules of collaboration and integration. Further, the defined processes often contain complex rules for selective utilization of services. To generate a report, the services extract the data from various data sources 222, i.e., the functionality characteristic, process the data adhering to the security guidelines i.e., the security characteristic and collaborate with the stakeholders and other services i.e., the collaboration characteristic when the task is complete. The completed task triggers the report service i.e., integration characteristic, which is rule based i.e., interoperability characteristic. The task is completed in stipulated time period as desired by the stakeholders i.e., performance characteristic. Hence, all service characteristics of the service are harnessed.

In one implementation, each of the service characteristics is measured against a set of parameters. The service characteristics are measured to allow the stakeholders to understand a performance or maturity level of a service and to define further requirements or improvements of the service. For the functionality characteristic, the set of parameters includes completeness, communication, interpretation of exceptions, exception handling, and service to stakeholder interaction. For integration characteristic, the set of the parameters includes data sources 222 supported for integration, APIs provided, third party tools, and stakeholder defined rules for integration. Further, for the interoperability characteristic, the set of parameters includes protocols for communications, data sources 222 supported for interaction, number of data definitions interpreted (text, HTML and the like), and number of adapters 220 available. Further, for the security characteristic, the set of parameters includes secured access to data, masking of sensitive information, secured retrieval, processing, and display of the data, and encryption of the data. Further for the collaboration characteristic, the set of parameters includes stakeholder to service interaction, service to service interaction, service to stakeholder interaction. Furthermore, for the performance characteristic, the set of parameters include concurrency, parallelism, availability, data volume, number of data sources 222, data structures, Service Level Agreement (SLA) adherence, processing speed, disk space, system Input/Output, process flow, and queuing.

The set of parameters defined above for each of the service characteristics is assessed under three levels, i.e., low, optimum, and complete for measuring effectiveness. In an example, the three levels are represented by numeric scores of 1, 2 and 3 respectively. In one implementation, a Service Effectiveness Index (SEI) is also calculated for each of the service characteristics. SEI is equal to an average of individual scores for each service characteristic. Table 2 shows an example illustrating the above formula of SEI:

A last type of actors includes data sources 222. Data sources are used to feed in data to the set of service tools to perform the set of services. Example of data sources 222 may include database, textual data, audio/video content and libraries. Data from different data sources 222 tend to be defined in native technology formats. Hence, the data extracts are converted into understandable format by means of adapters 220/converters. The data is retrieved and written back to a storage area by the set of service tools. The collaboration between the set of service tools and the data sources 222 is seamless to indicate a status back to the end user/related service. The data sources 222 are categorized into structured data, unstructured data, audio video data, internal data, and external data. The structured data is gathered by the set of service tools interfacing with the end users or defined by the APIs. The structured data typically conform to the business processes and have a well defined storage model. DB tables, XML, CVS are some forms of structured data. The unstructured data is textual data which is collated through channels of chat, emails, websites, policies, guidelines, standards, and the like. The audio/video data requires converters/adapters 220 to interpret the data. The interpretation is analyzed to derive the data/intelligence. The internal data is internal to the enterprise. The internal data is generated by the defined processes and/or by interactions of entities within an enterprise. The formats of internal data could be anything. The external data is gathered from external

TABLE 2

| Service characteristics and corresponding set of parameters | | Low | Optimum | Complete |
|---|---|---|---|---|
| Functionality | Completeness | | | 3 |
| | Communication | | 2 | |
| | Interpretation of exceptions | | 2 | |
| | Exception handling | 1 | | |
| | Service to user interaction | | | 3 |
| | Functionability Index | | 2.2 | |
| Performance | SLA adherence | | | 3 |
| | Processing speed | | 2 | |
| | Disk space | 1 | | |
| | System I/O | | 2 | |
| | Process flow | | 2 | |
| | Queuing | 1 | | |
| | Concurrency | | | 3 |
| | Parallelism | | 2 | |
| | Availability | | 2 | |
| | Data volume | 1 | | |
| | No of source systems | | 2 | |
| | Data structures | 1 | | |
| | Performance Index | | 1.833333333 | |
| Integration | Data sources supported for integration | | | 3 |
| | API's provided | | 2 | |
| | Third party tools supported | | 2 | |
| | User Defined rules for integration | 1 | | |
| | Integration Index | | 2 | |
| Interoperability | Protocols for communications | | 2 | |
| | Data sources supported for interaction | 1 | | |
| | No of data definitions interpreted (text, HTML etc) | | 2 | |
| | No of adapters available | | | 3 |
| | Interoperability Index | | 2 | |
| Security | Secured access to data | | 2 | |
| | Masking of sensitive information | | 2 | |
| | Secured retrieval, processing and display data | | 2 | |
| | Encryption of data | 1 | | |
| | Security Index | | 1.75 | |
| Collaboration | User to service interaction | | | 3 |
| | Service to service interaction | | | 3 |
| | Service to User interaction | | 2 | |
| | Collaboration Index | | 2.666666667 | |
| | Service Effectiveness Index | | 2.075 | | sources, which are not part of the enterprise processes. In one implementation, the data sources 222 are measured against availability, performance, integration, and scalability.

As mentioned above, apart from the actors, the DMA 200 may also include infrastructure to support the actors. The infrastructure may include several components, which enable the actors to perform the set of services in the DMA 200. The components of the infrastructure may include the enterprise model 210, the enterprise services 212, the enterprise metadata 214, the master data 216, and the adapters 220. The enterprise portal 208 provides a single interface for the entire DMA 200 to define, configure, administer, collaborate, search, and report data as mentioned above. Further, the enterprise portal 208 manages the stakeholder privileges and provides access to the services as per definitions. The enterprise portal 208 may include a set of service tools, such as a define tool, a configure tool, a report tool, an analytics and collaborate tool, a job monitor tool, and an administrative tool. The set of service tools is configured to perform the set of services defined above. In one implementation, the set of service tools are triggered by the triggering module 120. For example, when a user request is received, the triggering module 120, based on the request, may trigger the corresponding service.

In one implementation, the define tool hosts and provides access to the define service. The define tool may include metadata management unit and an enterprise architecture unit. The metadata management unit provides capability to the stakeholders to view, modify and/or insert the enterprise metadata 214 pertaining to into the database 126. The enterprise architecture unit enables the use of the service layer 204 including the enterprise model 210. Further, the enterprise architecture invokes respective tools of the set of service tools to avail one or more services of the set of services using the triggering module 120. Furthermore, the enterprise architecture allows the stakeholders to define business processes, data flow diagrams, data models, tasks and its supporting entities and attributes.

The configure tool hosts and provides access to the configure service. The configure tool may provide all the loosely coupled set of services for the stakeholders to choose and define customized job specifications. The configure tool is guided by rules inbuilt in the DMA 200 to ensure adherence to logical grouping. Logical grouping may refer to the inbuilt rules to ensure that the set of services used in conjunction can be supported by the system 102. In case of configuration of the set of services without a logical sequence or without considering a dependency, the configuration may be denied by the system 102. Further, the configure tool may enable the defined rules or dependency definitions to ensure guided processing of the set of services. The defined rules refer to pre-configured rules which are to be provided with, during the configuration. Further, the dependency definitions include validation criteria which the set of service need to adhere with before processing a request. Furthermore, the guided processing refers to the defined rules and dependency definitions, which provide guidance to achieve a specified job in a manner requested.

The report tool invokes the report service. The report tool provides detailed analysis of the set of metrics 218. A view of complete data lineage at any abstract layer is provided by the report service. The report tool facilitates business reporting when the DMA 200 is integrated with the data. The analytics and collaborate tool enables search of any component/element within the DMA 200 and also provides for collaboration (like email, workflow and triggers) for the stakeholders to interact with the one another in the ecosystem. Further, the job monitor tool displays jobs' status by connecting to a service metadata in the enterprise metadata 214. The enterprise metadata collaborates with service and process metadata on a predefined frequency/real time to gather and store statuses of the processes. The service metadata, the enterprise metadata, and the process metadata are explained below.

The administrative tool provides access to all components of DMA 200 to perform specific administration functions. The administrative tool enables the functions of configuring data, modifying/deleting data, managing adapters 220, ensuring data security, and enabling change management in the DMA 200. Change management may be understood with reference to description of FIG. 9.

Figure 4:
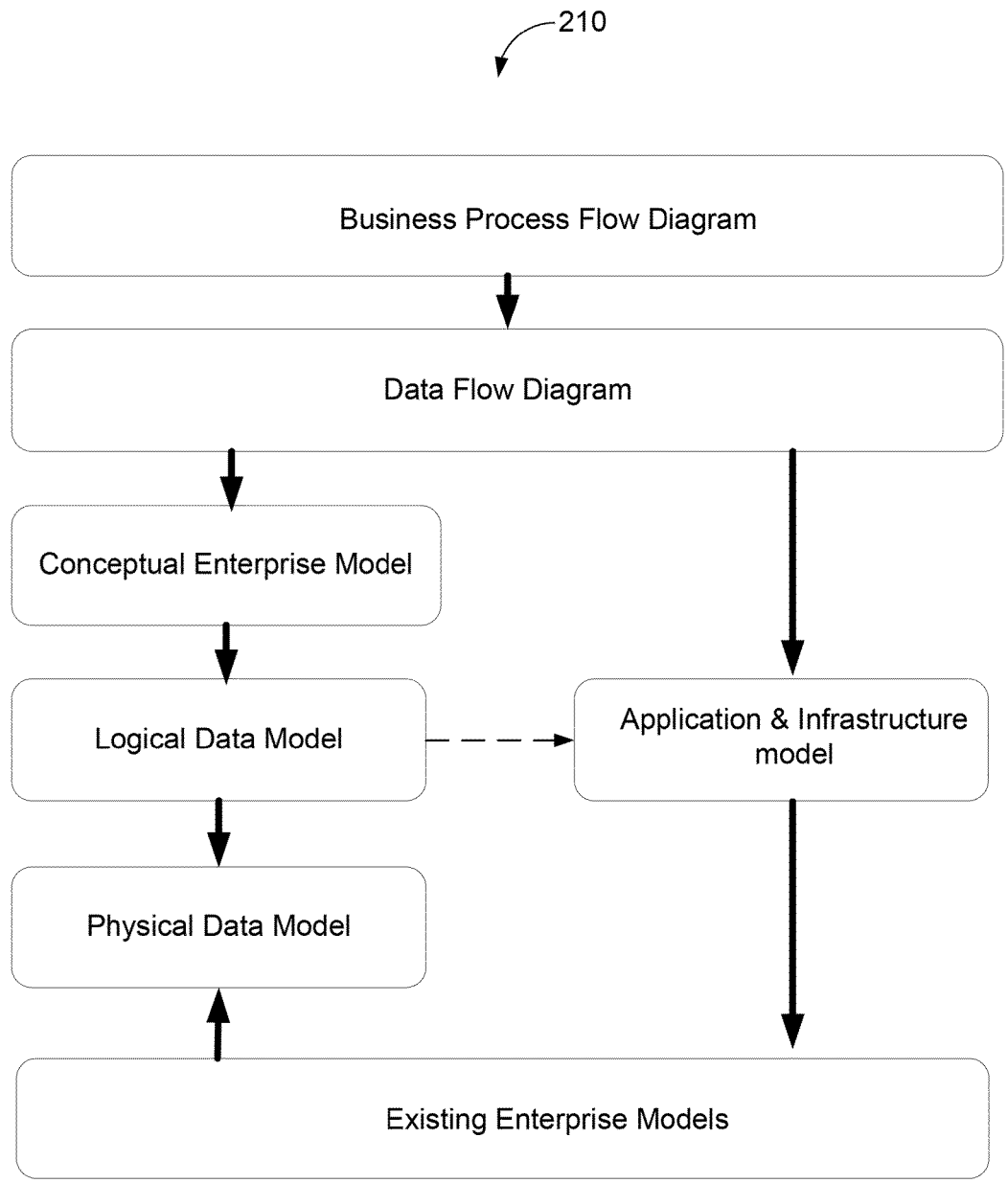
FIG. 4 is a pictorial representation of an enterprise model in the DMA of FIG. 2, in accordance with an embodiment of the present subject matter.

Referring now to a second component of the enterprise model 210 as shown in FIG. 4, in accordance with an embodiment of the present subject matter. The enterprise model 210, by means of semi-automatic mechanism, captures the enterprise processes and creates an integrated metadata. The enterprise model 210 forms a part of the define service and provides the stakeholders a flexibility to create the enterprise model 210. Further, the enterprise model 210 also provides facility to interlink modeling components such as a business process flow diagram, a data flow diagram, conceptual enterprise model, logical data model, physical data model, application and infrastructure model, and existing enterprise models.

Figure 5:
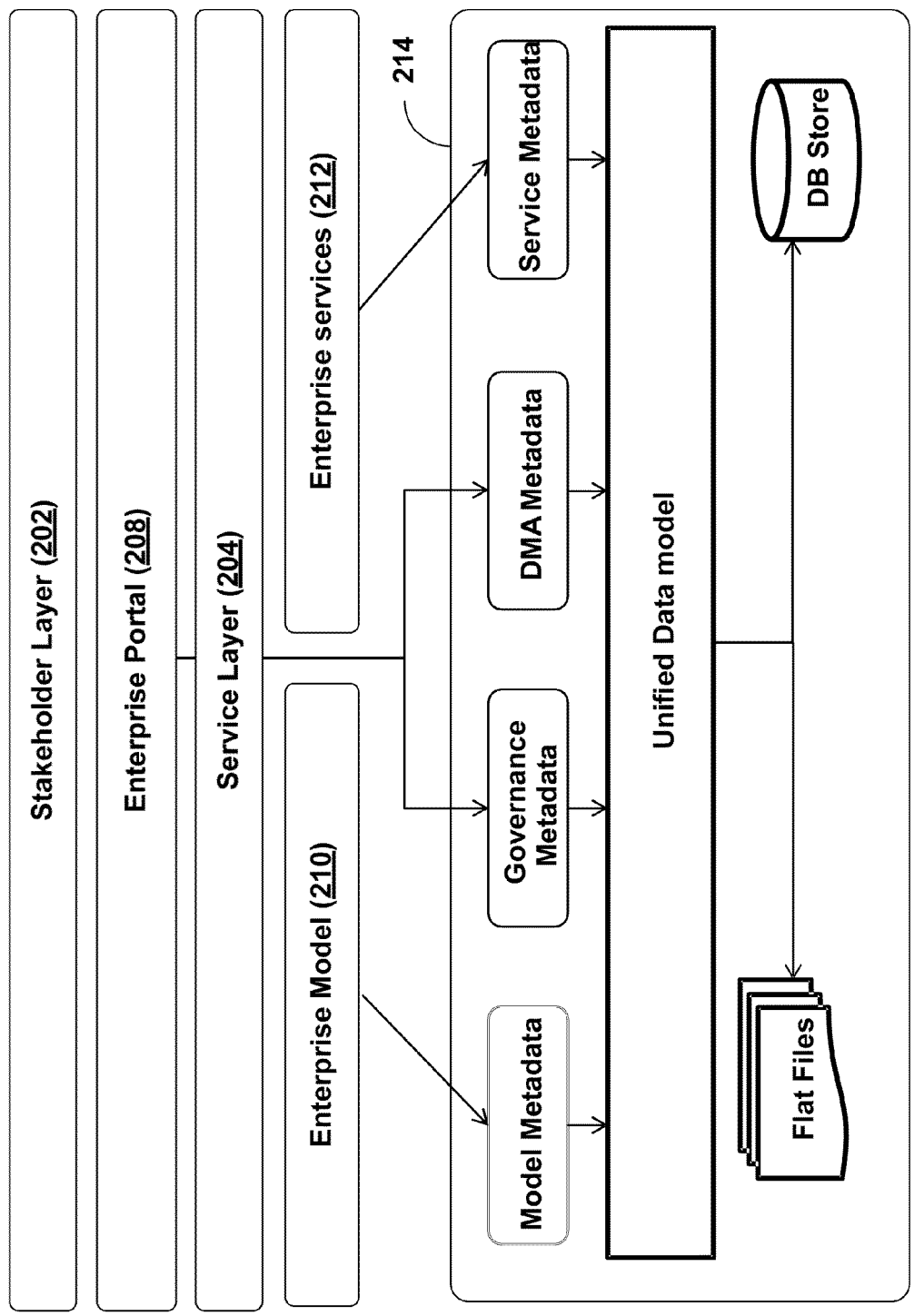
FIG. 5 is a pictorial representation of an enterprise metadata, in accordance with an embodiment of the present subject matter.

Referring now to a third component of the infrastructure, i.e., the enterprise metadata 214 as shown in FIG. 5, in accordance with an embodiment of the present subject matter. The enterprise metadata 214 is one single platform which captures any type of enterprise metadata 214 like business, technical, model, governance, and component consisting service and process metadata to give an integrated view of the enterprise. The enterprise metadata provides a central repository for DMA 200 and is stored in the database 126. The enterprise metadata is classified enterprise metadata 214 into four types of metadata, such as model metadata, service metadata, governance metadata, and DMA metadata. The model metadata may include business process, data flow, data models, and application model. The service metadata may include operational metadata of the set of services. The governance metadata may include metadata related to roles, responsibilities, policies, guidelines, standards, and SLA's. The DMA metadata may include definitions of the set of service tools, the set of services, data stores, stakeholders, users, access privileges, and the like. The enterprise metadata 214 may reside in multiple forms of storage techniques like flat files, DB storage, and the like.

Figure 6:
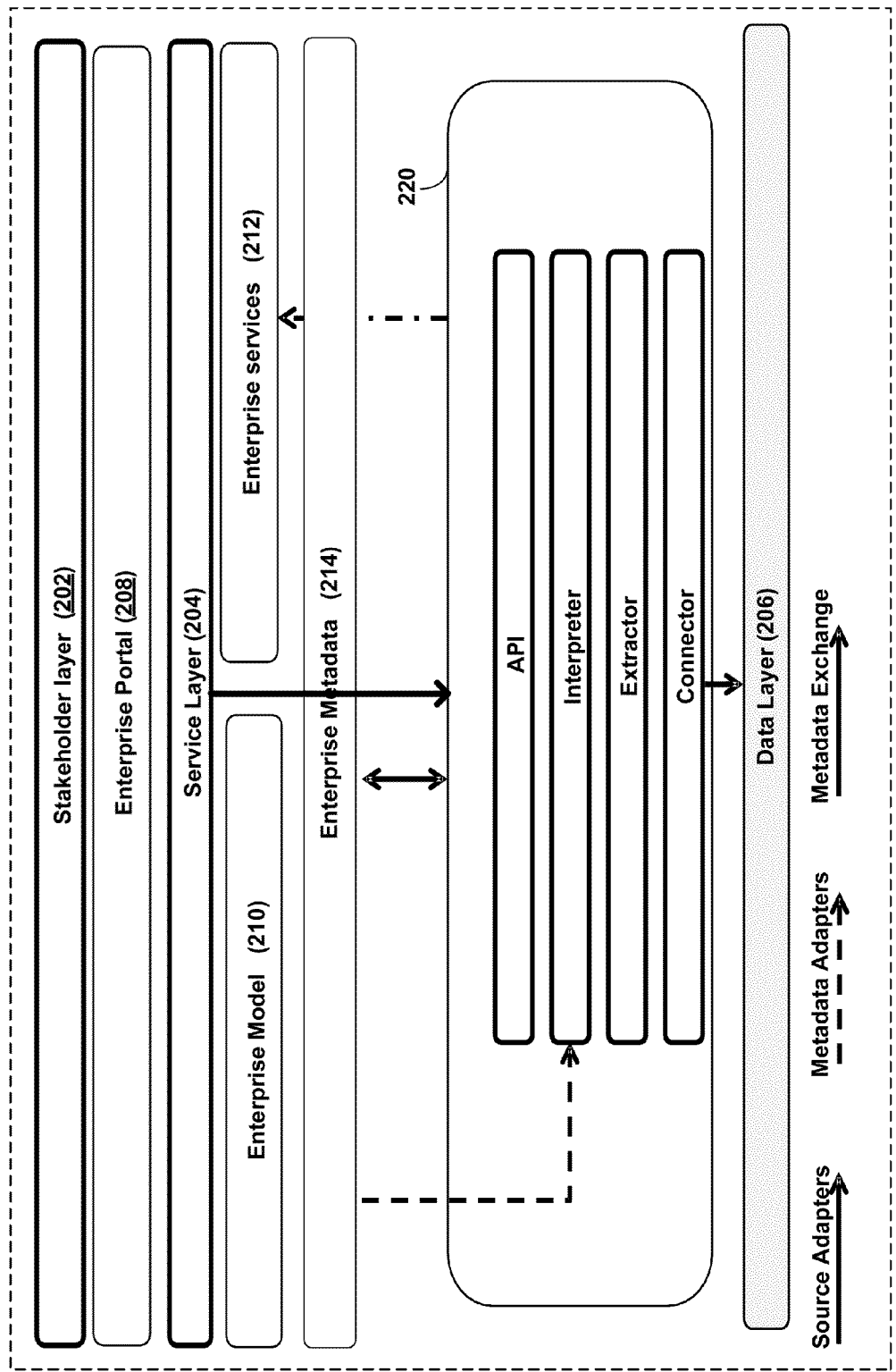
FIG. 6 is a pictorial representation of adapters, in accordance with an embodiment of the present subject matter.

Referring now to a fourth component of the infrastructure, i.e., the adapters 220 as shown in FIG. 6, in accordance with an embodiment of the present subject matter. The adapters 220 specialize in enabling communication and interpretation of messages from all data sources 222 contributing to the DMA 200. The communication and interpretations are facilitated by API for collaboration with other services. Further, the adapters 220 communicate with the data sources 222 to extract one of the data and metadata 214. The adapters 220 are accessed by the service layer 204 though the configure tool of the enterprise portal 208. Example of adapters 220 may include connectors, extractors, interpreter, and APIs. The connectors connect the applications and the data sources 222. The extractor extracts the data from the data sources 222 for processing based on defined functionality. The interpreter converts data specific to a data source into an understandable format. The interpreter comprises a translator, which applies rules for conversion of extracted data into defined format. For example, the metadata 214 extracted from a reporting tool, predefined rules are referenced by the translator to bring the metadata into a format defined by the enterprise metadata 214. Further, the APIs are used by the enterprise portal 208 to configure DMA 200 specific jobs.

Figure 7:
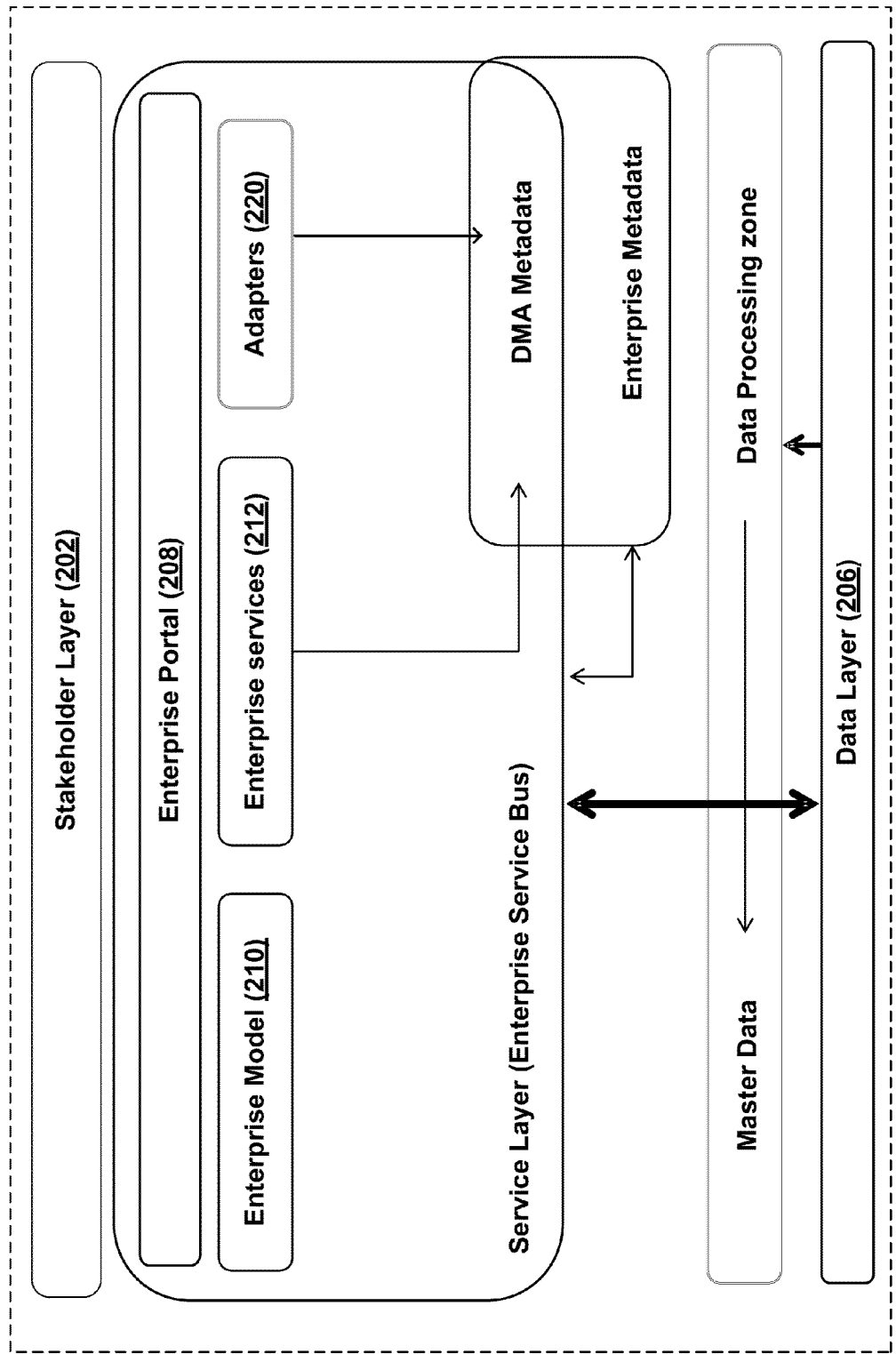
FIG. 7 is a pictorial representation of enterprise services, in accordance with an embodiment of the present subject matter.

Referring now to a fifth component of the infrastructure, i.e., the enterprise services 212 as shown in FIG. 7, in accordance with an embodiment of the present subject matter. The enterprise services 212 may include standard services, such as data profiling, cleansing, matching, transformation, loading, collaboration, security monitoring, auditing, backup and recovery. In one implementation, the enterprise model 210 may include the set of services defined above. The enterprise model 210 is available as configurable services in the service layer 204. The service layer 204 is based on an Enterprise Service Bus (ESB). In one example, functions of the ESB may be to collaborate between the set of services as per definition and to monitor a progress of the set of services. In one implementation, the service layer 204 may be a three tiered service layer 204. The three tiers in the service layer 204 are rendered component wise to the stakeholders. The three tiers are adapter tier, service tier, and report tier. The adapter tier may include services which are directly linked to data sources 222 and perform a certain predefined function. The service tier may include predefined services like engines for data matching, data cleansing, and reconciliation. The report tier may include certain predefined reports with templates to support. The report tier is supported by one or more services and adapters 220. Formulae used in derivation of reports are embedded in the service tier.

Each service of the set of services has a predefined master workflow. This master workflow integrates the services based on applicable logic. The service is rendered to stakeholders based on access privileges and service availability. Hence, in a predefined user service module, service rendered is a function of services that are committed to be delivered for a given user service module and the access privilege based on the user role profile.

i.e. $S_x = f_x(D)$ and $S_x(U_y) = f_{x,y}(D, U)$, where $S_x$ represents a rendered service, $S_x(U_x)$ represents the rendering of user service $S_x$ to a user category $U_y$, and f represents a dependency map. Further, the according to the formula shown above, Sx is a function of the data source D to which $S_x$ is associated with. For a user U with specific privileges y accessing the service Sx, the access provided shall be a combination of the data source D configured to the service and the privileges that the user has on the service.

Table 3 shown below maps the set of services with the set of service tools.

As mentioned above, the set of services are rendered to the stakeholders based upon the access privileges assigned to the stakeholders. The stakeholders may have varied purpose with the data and their interests are vested in certain portions or segments of the data. On the other hand, there would be some areas where there is a common interest of one or more stakeholders. For example, a business user with access to create his own metric using the report tool would not be required by a security officer, while the view of a report could be required by both. Similarly a view of a data point captured in an enterprise process could be viewed by all stakeholders.

The varied interests and certain level of overlap between various stakeholders indicate that the services required by each of these stakeholders would be different with or without overlap. The services, though independent as a component, are rendered in a role/privilege based manner. There would be some services where the parent role/privilege would have access to all child roles.

Hence, a service view is dependent on a privilege assigned to the stakeholders. It would have multiple variations based on a profile of a stakeholder.

Rendered Service($S_x$) = $S\{U_1, U_2 \ldots U_n\}$

Where
$S_x$ = Services rendered by the DMA 200
S = Service configured in the DMA 200
$U_1 \ldots U_n$ = Stakeholders with defined privileges The different possible categories of the rendered services are a full service category, a partial service category, and a no service category.

Full service ($S_x = S$ when $U_{(privileges)}$ = Complete). The full service category enables a stakeholder to access all the services.

Partial service ($S_x = S(U)$ when $U_{(privileges)}$ = Partial). The partial service category enables a stakeholder to access only certain services of the set of services.

No service ($S_x = 0$ when $U_{(privileges)}$ = No access). The no service category does not allow a stakeholder to access a service.

In one example, in the analytics service, a stakeholder performing a role of a consumer requires read only access to the report service. However, the same role could require access to metadata information. Hence, the stakeholder spans across the report service to analytics service. The stakeholder would be able to view both the services but may not have access to collaboration services. In the same case, the stakeholder may never define any metadata due to limitation of privileges assigned to the stakeholder.

Referring now to Table 4 which shows mapping between stakeholders and the set of service tools.

TABLE 3

| The set of service tools | The set of services | | | | | | | | |
|---|---|---|---|---|---|---|---|---|---|
| | Data Quality | Metadata | Modeling | Life cycle | Security | Governance | Collaboration | Data services | EDM Metrics |
| Report tool | | | | | | | | | X |
| Configure tool | X | X | X | X | X | | X | X | X |
| Define tool | | X | X | | | X | | X | |
| Administer tool | X | X | X | X | X | X | X | X | X |
| Analyze tool | | X | | | | | | | X |
| Master data tool | X | | | | X | | | X | |
| Collaboration tool | | | | | | | X | | |

TABLE 4

| | Stake-holders | | | | | | | | | |
|---|---|---|---|---|---|---|---|---|---|---|
| | Consumers | | | | | Administrator | | | | |
| | Internal - | | | | | | | | | |
| The set of service tools | Business users | CXO Level Executives | External agencies | Regulatory Bodies | Knowledge workers | Data Administrators | Process Administrators | Technology Administrators | Data Steward | Security officer |
| Report tool | X | X | X | X | X | X | X | X | X | X |
| Configure tool | | | | | X | X | | | | |
| Define tool | | | | | | X | X | | X | X |
| Administer tool | | | | | | X | | X | | |
| Analyze tool | | | | | X | X | X | X | X | X |
| Master data tool | | | | | X | X | | | | |

| | Stake-holders | | | | | | | | | |
|---|---|---|---|---|---|---|---|---|---|---|
| | Users | | | | | Architects | | | | |
| The set of service tools | Data Entry operators | Application users | Developers | Information processes | Knowledge officer | Data Architects | Data Modelers | Interface Architects | Process Architects | Designers |
| Report tool | | X | | X | | | | | | |
| Configure tool | | | X | X | | | | X | | X |
| Define tool | X | X | | X | X | X | X | X | X | X |
| Administer tool | | | | X | | | | | | |
| Analyze tool | | | X | X | X | X | X | X | X | X |
| Master data tool | | | | X | | X | | | | X |

As mentioned above, the set of services in the service layer 204 is mapped to respective data sources 222. The data sources 222 may be internal, external, reference data source, contents, and libraries. Based on the rules defined in configuration, a service is rendered. In case of any of data source is not available for service to a stakeholder, a message with a reason of unavailability is rendered to the stakeholder. This is part of the exception handling feature of the service.

Hence service rendering and availability, in a predefined service tool, is dependent on the data sources 222 availability.

$$S_x = f(D_1, D_2 \ldots D_n)$$

Where
$S_x$ denotes the rendered service,
$D_1 \ldots D_n$ denotes the data sources.

Figure 8:
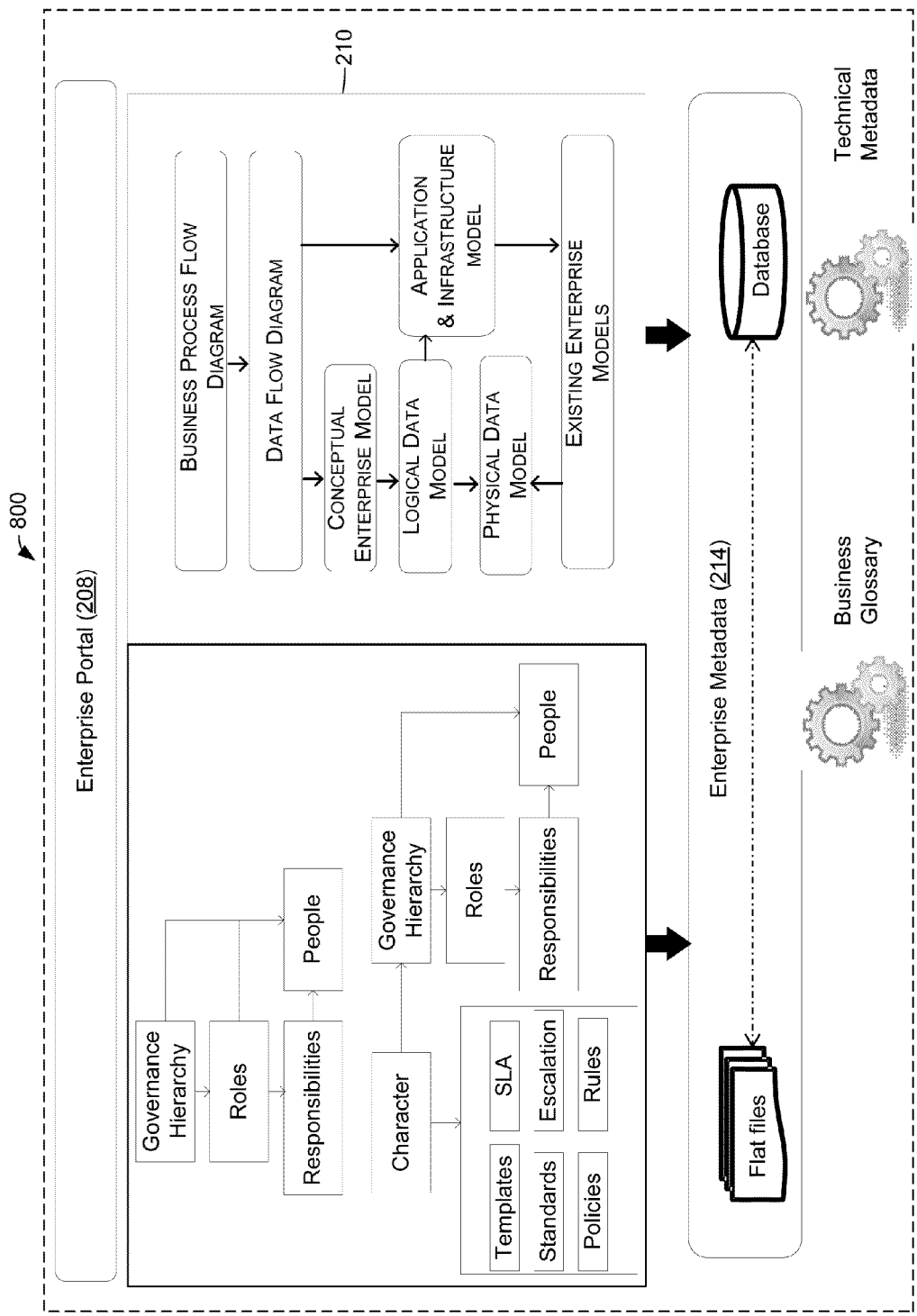
FIG. 8 illustrates a metadata creation process, in accordance with an embodiment of the present subject matter.

Referring now to FIG. 8, the enterprise metadata 214 creation process 800 is illustrated, in accordance with an embodiment of the present subject matter. Metadata creation is facilitated by manual and/or automated processes. The enterprise portal's define tool is used for creating the enterprise metadata 214. The underlying processes as depicted above are split into enterprise architecture and governance metadata. Enterprise architecture data includes information/data from all the models that the enterprise is dependent on. Governance structures/rules and definitions are defined using a separate input screen. These data sets reside in multiple forms of storage techniques like flat files, DB storage, and the like. The key strength of this module lies in being able to integrate these information/data seamlessly on a unified data model and provide information access to the end user. Business and technical metadata can be imported by means of adapters 220 to bring the data into a common understandable template used for enterprise metadata.

Figure 9:
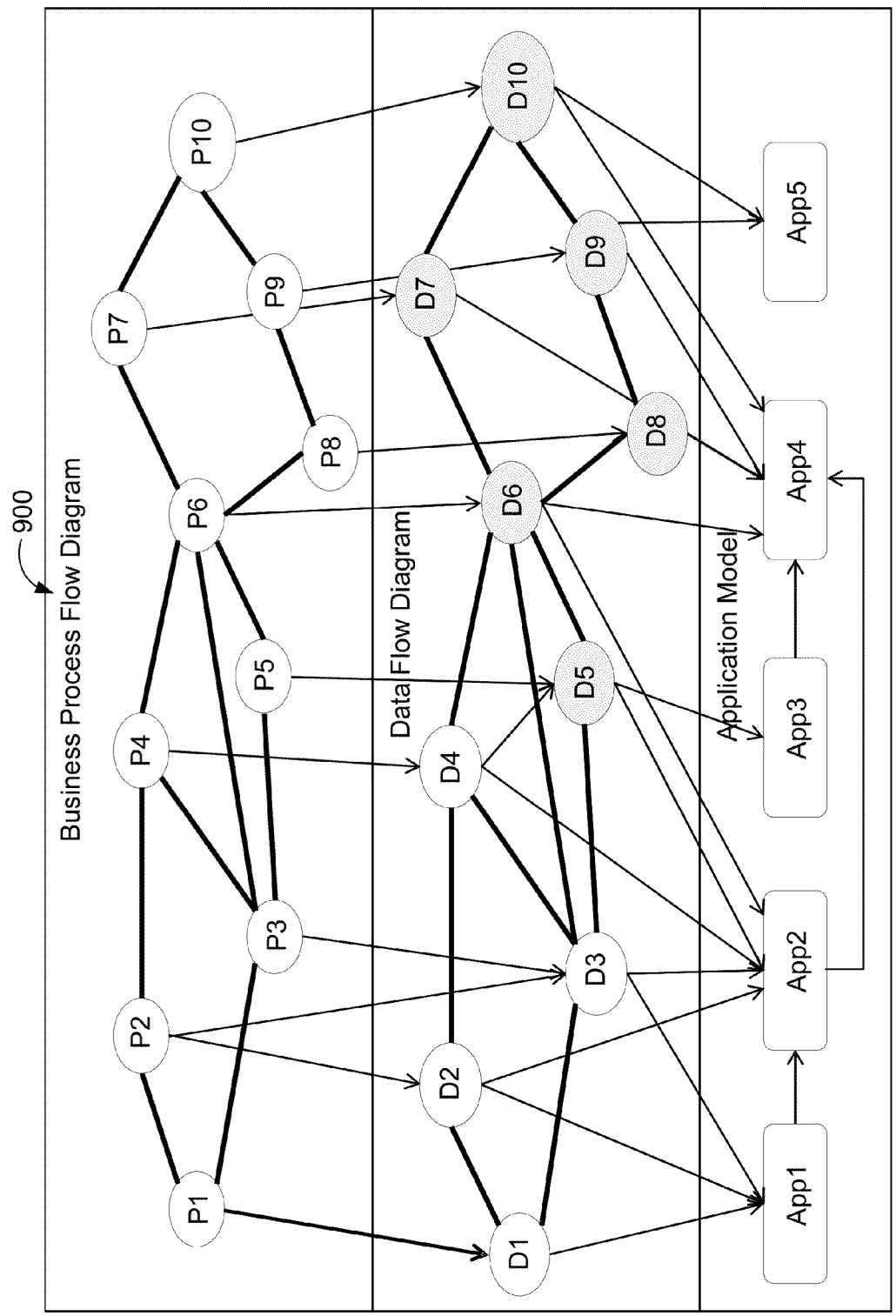
FIG. 9 is a pictorial representation of impact analysis for a change in data, in accordance with an embodiment of the present subject matter.

Referring now to FIG. 9, a pictorial representation 900 of impact analysis for a change is shown, in accordance with an embodiment of the present subject matter. Impact analysis is an administrative function. The administrative tool depends on richness of enterprise data for its analysis and interpretations. Based on the nature of the change, the impacted components at the lowest level of attributes and entities are identified. This identification includes indirectly impacted objects as well. The identified objects are subjected to cost and effort impact for the requested change. The calculation is based on function point analysis service. The diagram shows the impact lineage from a process level to the application level. This can be further extended to the data models and its relative attributes.

As mentioned above, every data captured in the enterprise has a defined purpose and is measured for its usage in the enterprise. Some of the data however can cease to be used over a period of time due to change in enterprise processes or regulatory directions. Hence, the set of metrics 218 may be used to determine the data being actively used as against dormant data. This is used to optimize storage needs or costs as well as ensuring adherence of enterprise processes and priorities. In one implementation, the data gathered in the enterprise may be analyzed using the set of metrics 218. The set of metrics may include a data usage index, a data value index, a data quality index, and a data effectiveness index.

Every data element when rolled up to an abstract level of enterprise process has many dependent objects and/or dependent processes. The data usage index (DUI) may be derived using the following equation:

$$DUI(x) = 100 * \frac{\sum HITS(x)}{TOTAL(HITS)}$$

where x=Data element

ΣHITS(x)=ΣHITS(ΣDEPENDENT OBJECTS(x))+HITS (ΣDEPENDENT PROCESS(x)+ΣIndependent Hits(x))

TOTAL (HITS)=ΣHITS(ΣALL OBJECTS+ΣALL PROCESSES+ΣTOTAL INDEPENDENT HITS

HITS may be understood as a number of access instances on the object considered. For example, 10 users are accessing a report 'X' with a data element 'Y', then the number of HITS on the X and Y shall be counted as 10. In case of the access to element 'Y' done by other processes/objects is 5, the total hits on the element Y is 15 (10+5). To derive the DUI, the dependent objects and dependent processes are mapped to the data element. Based on the DMA 200 monitored data of hits to the components and the individual hits to the component directly, for example, by means of SQL, the aggregate hits for the component are determined. Total hits to the entire DMA 200 are taken as denominator to arrive at a percentage of hits to the object under consideration.

The DUI is then indexed based on user-defined criteria. The enterprise can define the DUI definition. In one example, the DUI is defined in Table 5. Table 5 gives an example of the criteria stating that if a value of the percentages i.e. index definition lies in that range, the index value can be specified as per the definition.

TABLE 5

Data value index

| Index value | Index definition |
|---|---|
| 1 | 0-10% |
| 2 | 10-30% |
| 3 | 30-50% |
| 4 | 50-70% |
| 5 | 70-100% |

The DMA 200 monitors all the hits to the data elements and its dependent processes and objects. These hits are then rolled up to the element level to derive the total hits. Total hits are an aggregate of all the hits in the enterprise. If the data elements are considered exhaustive, then a summation of total hits on all elements is equal to total hits on the DMA 200. In one example, a data element C, as shown in table 6, has the lowest hit while a data element B has the highest hit. Hence the index is defined accordingly. An illustration of calculation of ΣHITS is provided in Table 7 as shown below.

TABLE 6

Hits index

| Data Element | Hits | Hits % age | Hits Index |
|---|---|---|---|
| X | 102 | 22.07792208 | 2 |
| Y | 3 | 0.649350649 | 1 |
| Z | 7 | 1.515151515 | 1 |
| A | 50 | 10.82251082 | 2 |
| B | 300 | 64.93506494 | 4 |
| C | 0 | 0 | 1 |
| Total Hits | 462 | | |

TABLE 7

Hits derivation

| Data Element | Dependent objects & processes | No. of hits |
|---|---|---|
| A | Obj1- Report | 23 |
|   | Obj2- Application | 14 |
|   | Obj3- Cube | 5 |
|   | Process1- Data extract | 2 |
|   | Process2- Service | 1 |
|   | Other hits- SQL hits | 5 |
| Total Hits | | 50 |

A second type of metrics is Data Value Index (DVI). Value of a data element is defined as a measure of its worth in the enterprise. It is calculated by defining an index of its criticality and dependent objects. For example, if a data element is used by multiple processes and applications, a criticality index of the data element is derived based on criticality of these processes and applications. A highest index of the dependent processes and applications is considered. Further, in order to determine the DVI, a number of components used in the data may be taken into consideration. Components are objects and processes that qualify data. For example, 'Date of Birth' is an object of 'Age'. Different processes may use this object from different perspective, such as eligibility to vote, eligibility for school admission, and the like. This is an indication of effort in terms of cost and time spent as against the total effort of all components. On determining these two indices, an average of the two indices yields the DVI. The DVI helps in understanding a worth of the data.

Every element's value is measured based on the criticality of its dependent objects and processes, and the number of dependent objects and process. Based on this, the DVI may be determined using the following formula:

DVI$(x)$=Average(Criticality Index$(x)$,Dependency Index$(x)$), where

Criticality Index$(x)$=Highest (Criticality index (dependent Objects), Criticality index (Dependent processes))

Dependency Index$(x)$=user defined index value based on dependency % age, as explained below Criticality index is based on predefined rules for each process and object by measuring the parameters shown in Table 8.

TABLE 8

Criticality index

| Index value | Index definition |
|---|---|
| 1 | No impact, no use |
| 2 | Alternatives available, no impact, in use |
| 3 | Alternatives available, but impact would be there |
| 4 | Direct Impact on certain applications |
| 5 | Operations shall stop |

In one example, the DVI is calculated using a total number of dependency objects and processes gathered from the enterprise metadata. The dependent objects and processes are classified based on the above definitions of index value. A highest value of all the indexes is taken as the criticality index for that element.
Dependency percentage is calculated as:

Dependency %=Number of dependent objects(x)/Total no of objects & processes x=X, Y, Z, A, B, C
Total number of objects and processes=80
Based on the dependency %, the DVI is defined as per the Table 9 shown below:

TABLE 9

Dependency Index value definition

| Index Value | Index value definition |
|---|---|
| 1 | 0-10% |
| 2 | 10-30% |
| 3 | 30-50% |
| 4 | 50-70% |
| 5 | 70-100% |

Table 10 computes and publishes the DVI. Table 10 shows that Element Y dominates on the criticality index while element Z dominates on dependent objects. Hence both of them acclaim the highest value. Further, element B has the lowest value with low criticality and low dependent objects.

TABLE 10

DVI derivation

| Element | No of dependent objects | No of Dependent process | Criticality Index | Dependency % age | Dependency index | Value index |
|---|---|---|---|---|---|---|
| X | 23 | 2 | 3 | 31% | 2 | 2.5 |
| Y | 2 | 3 | 5 | 6% | 1 | 3 |
| Z | 50 | 2 | 2 | 65% | 4 | 3 |
| A | 5 | 4 | 4 | 11% | 1 | 2.5 |
| B | 2 | 2 | 1 | 5% | 1 | 1 |
| C | 1 | 1 | 3 | 3% | 1 | 2 |
| Total | 83 | 14 | | Total objects & processes = 80 | | |

A third type of metrics is Data Quality Index (DQI). The DQI may be determined based on data quality parameters, such as of latency, uniqueness, consistency, accuracy, and sufficiency (LUCAS). The data quality parameters may be selected from individual metrics, such as, % Checksum Variance, % Reference Integrity Failures, % Duplication, % Junk or Accurate Data, % Data Population, or any other metric conventionally known in the art. DQI may be calculated at an abstract level, such as, element level, entity level, system level, or enterprise level, of data. The DQI may be computed at an abstract level may be computed by computing intermediary (child/grandchildren levels) DQIs for the data, where each of the intermediary DQIs corresponds to at least one of a data quality parameter. For example, for computing DQI at enterprise level, intermediary DQI may correspond to DQI computed for the system level. Similarly, for computing DQI at the system level, intermediary DQI may correspond to DQI computed for the entity level. Likewise, for computing DQI at the entity level, intermediary DQI may correspond to DQI computed for the element level. Further, a weighing factor associated with each of intermediary DQIs may be identified based on the level of abstraction. A final DQI at a final level of abstraction may be determined based on a weighted average of the plurality of intermediary DQIs. The weighted average is calculated based on the weighing factors.

In one example, to determine a single DQI at a system level of abstraction, where the system level of abstraction includes any number of entities, the DQIs at the entity levels may be assigned weighing factors and a weighted average may be determined to obtain the single DQI at the system level of abstraction. The single DQI at the system level of abstraction may be a holistic value of data quality of the entire data repository. In this manner, the user may be provided a DQI at any level of abstraction.

A fourth type of metrics is Data Effectiveness Index (DEI). The DEI may be calculated at a lowest to an abstract level. The DEI may exist at the data element or even at a business process level. The formula used in calculation of the DEI is:

$$DEI(\alpha) = \frac{(AVERAGE(DUI(x, y, \ldots n \in \alpha)) * \omega DUI) + (AVERAGE(DVI(x, y, \ldots n \in \alpha)) * \omega DVI) + (AVERAGE(DQI(x, y, \ldots n \in \alpha)) * \omega DQI) * \omega\alpha}{(DUImax * \omega max + DVImax * \omega max + DQImax * \omega max) * \omega\alpha max}$$

Where

α=Element (Function/Process/Sub process/Task/Entity/Table/Attribute)
DUI=Data Usage index
DVI—Data Value Index
DQI—Data Quality index
x, y . . . n=Child elements of α
ω=weights defined by the user for the metric (ωDUI, ωDVI, ωDQI)
ωα=Weight assigned to the element
$\omega_{max}$=Max weight assigned to the element
$DUI_{max}$, $DVI_{max}$, $DQI_{max}$=Max weight assigned to metric DUI, DVI and DQI respectively As an example, consider a subject area (S1) with two tables T1 and T2 having X, Y, Z and A, B, C as their attributes. To derive the effectiveness of the tables and subject area (S1), following approach is adopted:

TABLE 11

Average metrics (DUI, DVI, DQI) for Table T1 & T2 with Data effectiveness Index at element level

| Data Element | DUI | ω | DVI | ω | DQI | ω | Weighted average (metric) | ωα | Weighted average (element) | Data effectiveness index |
|---|---|---|---|---|---|---|---|---|---|---|
| X | 2 | 3 | 2.5 | 2 | 3 | 2 | 17 | 2 | 34 | 25% |
| Y | 1 | 3 | 3 | 2 | 2 | 2 | 13 | 1 | 13 | 10% |
| Z | 1 | 2 | 3 | 1 | 2 | 1 | 7 | 2 | 14 | 10% |
| AVERAGE (T1) | 1.33 | | 2.83 | | 2.33 | | | | | |
| A | 2 | 3 | 2.5 | 2 | 3 | 2 | 17 | 2 | 34 | 25% |
| B | 4 | 3 | 1 | 2 | 2 | 2 | 18 | 2 | 36 | 27% |
| C | 1 | 2 | 2 | 1 | 1 | 1 | 5 | 2 | 10 | 7% |
| AVERAGE (T2) | 2.33 | | 1.83 | | 2.00 | 3 | | | | |

TABLE 12

Data Effectiveness of the tables T1 & T2 (with assigned weights for metrics & elements)

| Element | DUI | ω | DVI | ω | DQI | ω | Weighted average (metric) | ωα | Weighted average (element) | Data effectiveness index |
|---|---|---|---|---|---|---|---|---|---|---|
| T1 | 1.3 | 3 | 2.8 | 2 | 2.3 | 3 | 16.4 | 2 | 32.8 | 24% |
| T2 | 2.3 | 3 | 1.8 | 2 | 2 | 3 | 16.5 | 1 | 16.5 | 12% |

TABLE 13

Data Effectiveness of subject area S1 (with assigned weight for metrics and elements)

| Element | DUI | ω | DVI | ω | DQI | ω | Weighted average (metric) | ωα | Weighted average (element) | Data effectiveness index |
|---|---|---|---|---|---|---|---|---|---|---|
| S1 | 1.8 | 2 | 2.3 | 2 | 2.15 | 3 | 14.65 | 2 | 29.3 | 22% |

In one implementation, the DMA 200 may also be used to calculate an Information intelligent quotient (IIQ) of the data sources 222. Intelligence quotient for a specific data source is a value of data contained in the data source. IIQ is defined as:

$$IIQ_D = (p * \omega * n)/\Sigma n$$

Where
$IIQ_D$ = Intelligence Quotient of a data source D
p = derivation parameters
ω = Weights derived by process based on parsing
n = Ratings defined by the stakeholder for the parameters
if $\Sigma n = 0$, then $IIQ_D = 0$.

In one example, derivation parameters considered for derivation may include functional relevance, event related search, sentiment quotient, occurrence or position search, and number of occurrences. Functional relevance may include matching keywords from master data. Event related search is based on key word and synonym search defined by a stakeholder. Sentiment quotient may be positive or negative. Occurrence or position search may include file name, header, body, special fonts. Number of occurrences search may include number of times the element occurred in the file.

Figure 10:
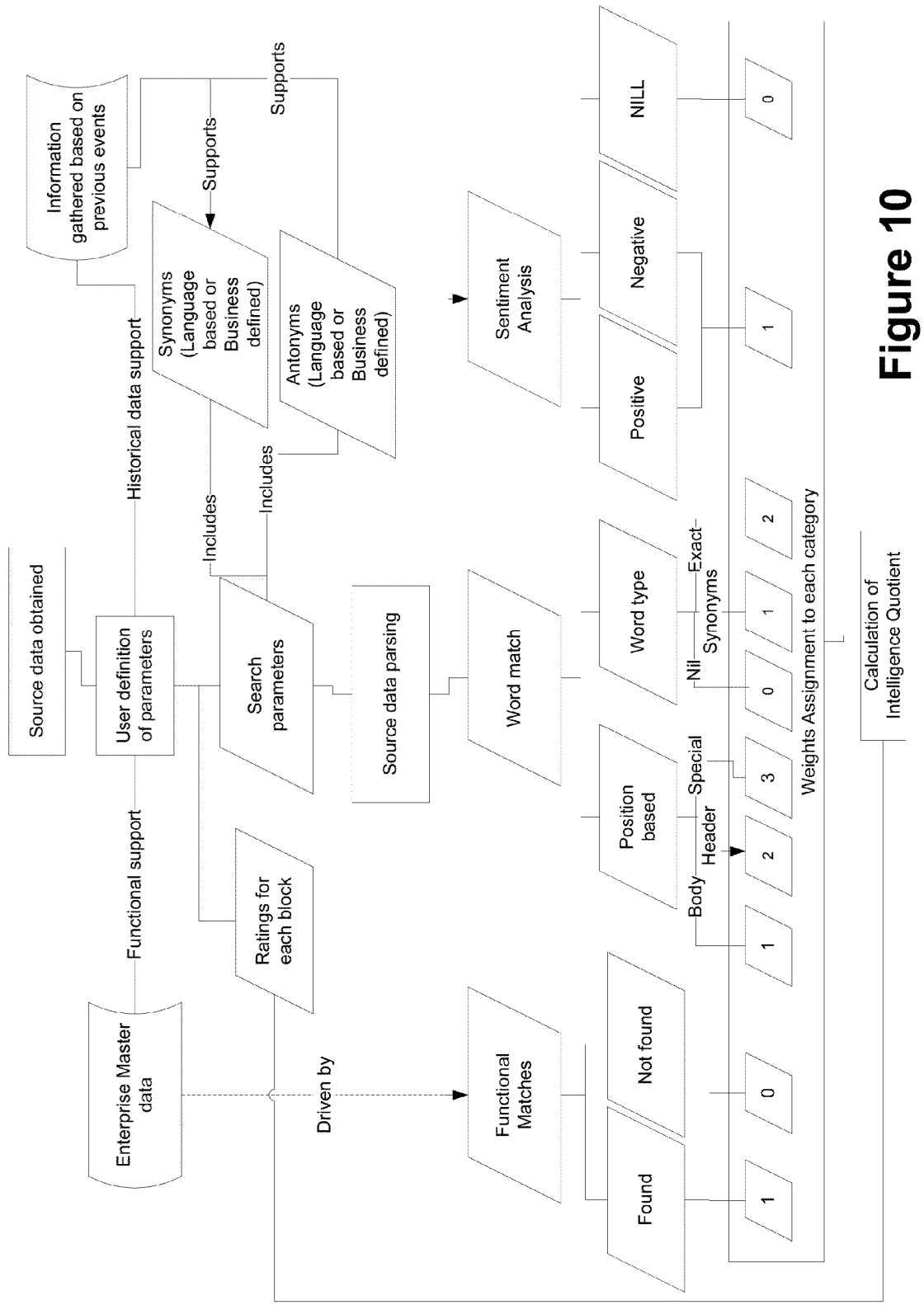
FIG. 10 is a flowchart illustrating generation of information intelligent quotient, in accordance with an embodiment of the present subject matter.

Table 14 and Table 15 illustrate examples of the weights assigned and IIQ calculation, respectively. Further, FIG. 10 shows a process flow of calculating an IIQ for a data source FIG. 10 shows that, at first, a data source is identified for processing. Then a user defines the derivation parameters for processing. This includes referring to data from master data to gather key words for functional relevance and from a predefined list of words for word and synonym search. Subsequently, search parameters are defined with inputs from the above step. Then, ratings for each block are specified by the user. The source data parsing is carried out by the computer processor. For a 'find' in functional match, '1' is assigned and for 'not found,' '0' is assigned. Word matching is segregated into two types, namely, position based search and word type based search. In position based search, if a word is found in body of text, '1' is assigned, if the word is found in header, then '2' is assigned and if the word is found in special font, then '3' is assigned. In word type based search, if the word is 'not found', then '0' is assigned. However, if a synonym of the word is found, then '1' is assigned, or if an exact word match is found, then '2' is assigned. Subsequently, sentiment analysis is performed. In sentiment analysis if positive or negative sentiment words are found then '1' is assigned, else '0' is assigned. All these assignments along with the ratings are used by the processor to determine the IIQ.

TABLE 14

Weights assigned

| Parameters | Conditions | Weight |
|---|---|---|
| Functional Match | Found | 1 |
| | Not Found | 0 |
| Word match-position | NA | 0 |
| | Body | 1 |
| | Header | 2 |
| | Special | 3 |

TABLE 14-continued

Weights assigned

| Parameters | Conditions | Weight |
|---|---|---|
| Word Match-Type | NIL | 0 |
| | Synonym | 1 |
| | Exact | 2 |
| Sentiment Analysis | Positive/negative | 1 |
| | None | 0 |

TABLE 15

IIQ calculation

| Parameter | User defined Rating | System assigned weight | Weighted rating |
|---|---|---|---|
| Functional Match | 5 | 1 | 5 |
| Word match-Position | 3 | 3 | 9 |
| Word Match- Type | 2 | 2 | 4 |
| Sentiment Analysis | 4 | 1 | 4 |
| | | Information Intelligence quotient | 3.142857143 | performance index is defined as a performance score provided by the actors of DMA 200. The DMA performance Index has two components, namely, user defined performance index and system defined performance index.

The User Defined Performance Index (UDPI) involves user inputs and therefore data gathering mechanism is survey based. In order to calculate the UDPI, certain parameters and rating criteria are defined. The parameters may include functional parameters and non-functional parameters. The functional parameters may include service coverage, Interoperable, Collaboration, Metric correctness, and the like. Non Functional parameters may include availability, usage, data agility, efficiency, reduction in cost of operations, and the like.

The scores are viewed at user group and parameter based.

Score per user group=
    AVERAGE(SCORE(Functional & Non Functional))

Overall score=AVERAGE(AVERAGE(SCORE(Functional)),AVERAGE(SCORE(Non-Functional)))

An Illustration of the above formulae is provided in Table 16 below. Indicative scores are:
1—Poor, Not as per expectations
2—Good, Yet to meet expectations
3—Satisfied, as per expectations
4—Very good, Provides more than expected
5—Excellent—Beyond expectations

TABLE 16

Calculation of UDPI

| User Group | Functional | | | | | Non-Functional | | | | | |
|---|---|---|---|---|---|---|---|---|---|---|---|
| | Service coverage | Integrable | Interoperable | Collaboration | Metric correctness | Availability | Usage | Data Agility | Efficiency | Cost of operations | Score per user group |
| Consumers | 5 | 3 | NA | 4 | 4 | 3 | 2 | 4 | 3 | 4 | 3.56 |
| Administrators | 4 | 3 | 4 | 2 | 3 | 4 | 4 | 3 | 3 | 5 | 3.50 |
| Users | 4 | 3 | 4 | 2 | NA | 5 | 3 | 3 | 4 | 4 | 3.56 |
| Architects | 5 | 4 | 3 | 3 | 5 | 2 | 5 | 3 | 4 | NA | 3.78 |
| Score per measure | 4.50 | 3.25 | 3.67 | 2.75 | 4.00 | 3.50 | 3.50 | 3.25 | 3.50 | 4.33 | |
| | | | | | | | | | | | Overall Platform score |
| | Functional Index | | 3.633333333 | | | Non Functional Index | | 3.616666667 | | | 3.625 |

In one implementation, the analytics and collaborate tool may also determine Data Relevance Index (DRI) for a data source in the enterprise. In order to calculate DRI, a master list of key words for selection is created. The master list of key words is matched against content of the data source to find a match of the relevant key words (synonyms are not used here). On finding a match, the key word is updated with the match. Based on the weights provided to the master values and key words from table names, the data relevance index is defined for the data source.

$$DRI_D = (v^* \omega^* n)/\Sigma n$$

Where
DRI=Data Relevance Index for data source D
v=Values of data elements
ω=Weights derived by process based on parsing
n=Ratings defined by the user for the parameters In implementation, the analytics and collaborate tool may also calculate a DMA performance index. The DMA In the illustration shown in Table 16, the DMA 200 performs well in service coverage, but fairs low on collaboration. Architect community scores high on performance of the DMA 200. Overall score indicates that DMA 200 has reached a satisfaction level and progressing towards value additions.

The other type of performance index is the System Defined Performance Index (SDPI). The SDPI is driven by a Service Level Agreement (SLA) definitions provided by a stakeholder. The SDPI is denoted by color coding Red, amber, green. The color coding R-Red is indicative that the SDPI is less than tolerance limit, the color coding A—Amber is indicative that the SDPI is equal to tolerance limit, and the color coding G—Green is indicative that the SDPI is greater than the tolerance limit In one implementation, the SLA definitions are referred to while deriving the SDPI from the enterprise metadata. The parameters which contribute to the SDPI are shown in Tables 17 and 18.

TABLE 17

SDPI definitions

| | System parameters | SLA Definition | Formula |
|---|---|---|---|
| Availability | Service failures | Zero | Zero occurrence of "Service status = Failed" |
| Availability | Availability of services | 99% availability | Total downtime of services/Total time for the period |
| Collaboration | Failed communications | Zero | Zero occurrence of "Message cannot be sent to the user/service" |
| Cost of operations | Reduction in administration effort | 10% | (Total admin login time for prev period - Total admin time for current period)/total to time for prev period is greater than 10 |
| Data Agility | No of data sources integrated to EDM | 100% | Total no of sources integrated to EDM/ Total no of sources in enterprise |
| Data Agility | Availability of EDM metrics | 100% | Availability as per definitions |
| Efficiency | Delays due to performance | Less than 1% | No of services exceeding time limits/Total no of services run Total time taken by all the services/Total time defined for all services |
| Efficiency | Reduction time taken for configuration per user | 10% | Time taken by user/configuration (Prev-current/Prev) |
| Integrable | No of application integrated to the portal | 100% | No of applications in EDM/ Total no of application in enterprise |
| Integrable | No of third party tools failures | Zero | Zero occurrence of "Configuration failed due to non compatibility of the service" |
| Interoperable | Service to service interoperability | 100% | No of services with open interoperability definitions/Total no of services |
| Metric correctness | P1 tickets | <5 per quarter | P1 tickets <5 |
| Service coverage | Tickets for new service requests | <5 per month | Total no of new service requests <5 per month |
| Usage | Hits to EDM | Increase by 3% | (Hits for the current period - Hits for the previous period)/Hits of the previous period |
| Usage | EDM Usage | One login/ users per day | One login instance/User |

TABLE 18

SDPI derivation

| System parameters | SLA Definition | Tolerance | Recorded value | Compliance Status |
|---|---|---|---|---|
| Service failures | Zero | 2 | 3 | R |
| Availability of services | 99% availability | 97% | 97% | A |
| Failed communications | Zero | 5 | 3 | G |
| Reduction in administration effort | 10% | 5% | 5% | A |
| No of data sources integrated to EDM | 100% | 95% | 70 | R |
| Availability of EDM metrics | 100% | 98% | 99 | G |
| Delays due to performance | Less than 1% | 2% | 2% | A |
| Reduction time taken for configuration per user | 10% | 5% | 20% | G |
| No of application integrated to the portal | 100% | 95% | 70 | R |
| No of third party tools failures | Zero | 2 | 3 | R |
| Service to service interoperability | 100% | 95% | 95% | A |
| P1 tickets | <5 per quarter | 8 | 3 | G |
| Tickets for new service requests | <5 per month | 8 | 4 | G |
| Hits to EDM | Increase by 3% | 1% | 5% | G |
| EDM Usage | One login/ users per day | One login/ users per week | One login/ users per day | G |
| Overall Status | | | | G |

Figure 11:
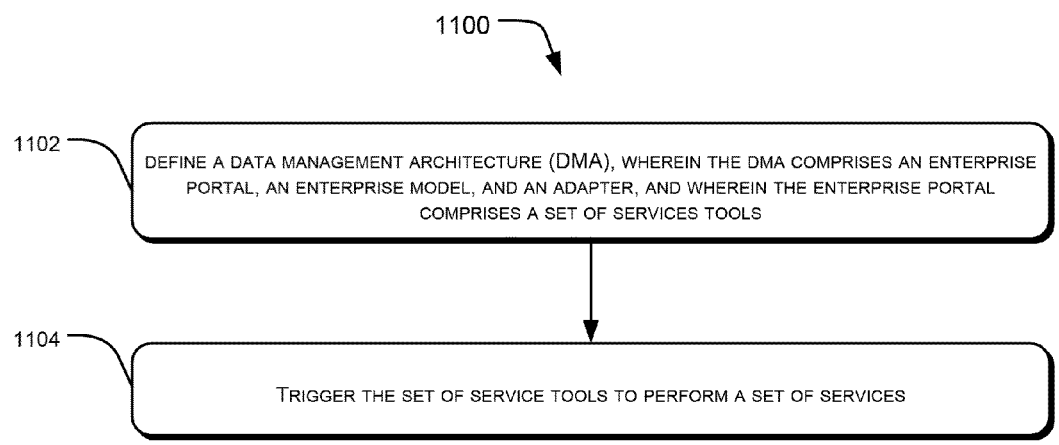
FIG. 11 shows a flowchart illustrating a method managing data of an enterprise, in accordance with an embodiment of the present subject matter.

Referring now to FIG. 11, a method 1100 for managing data of an enterprise is shown, in accordance with an embodiment of the present subject matter. The method 1100 may be described in the general context of computer executable instructions. Generally, computer executable instructions can include routines, programs, objects, components, data structures, procedures, modules, functions, etc., that perform particular functions or implement particular abstract data types. The method 1100 may also be practiced in a distributed computing environment where functions are performed by remote processing devices that are linked through a communications network. In a distributed computing environment, computer executable instructions may be located in both local and remote computer storage media, including memory storage devices.

The order in which the method 1100 is described is not intended to be construed as a limitation, and any number of the described method blocks can be combined in any order to implement the method 1100 or alternate methods. Additionally, individual blocks may be deleted from the method 1100 without departing from the spirit and scope of the subject matter described herein. Furthermore, the method can be implemented in any suitable hardware, software, firmware, or combination thereof. However, for ease of explanation, in the embodiments described below, the method 1100 may be considered to be implemented in the above described system 102.

At block 1102, a Data Management Architecture (DMA) 200 is defined. The DMA 200 may include an enterprise portal 208. The enterprise portal 208 may include a set of service tools. The set of service tools may include at least one of a report tool, a configure tool, a define tool, an administrative tool, an analytics and collaborate tool, and a job monitor tool. The set of service tools is configured to perform a set of services on data generated in an enterprise. The DMA 200 also includes an enterprise model 210 for analyzing an enterprise process in order to create and modify enterprise metadata 214 of the data originating from the enterprise process. Further, the DMA 200 may also include at least one adapter for communicating with a data source associated with the enterprise process for extracting the enterprise metadata 214 from the data source. The DMA may also include a set of metrics. The set of metrics 218 is used for analyzing the data. In one implementation, DMA 200 may be defined in the definition module 118.

At block 1104, the set of service tools are triggered to perform respective set of services. In one example, the set of service tools is triggered by the triggering module 120.

Although implementations for methods and systems for managing data of an enterprise have been described in language specific to structural features and/or methods, it is to be understood that the appended claims are not necessarily limited to the specific features or methods described. Rather, the specific features and methods are disclosed as examples of implementations for managing data of an enterprise.

We claim:

1. A system to manage data of an enterprise, the system comprising:
   a processor; and
   a memory coupled to the processor, wherein the memory comprises,
      a definition module defining a data management architecture (DMA) to manage the data, the DMA comprising,
         an enterprise model for analyzing an enterprise process to create and modify enterprise metadata corresponding to the data of the enterprise generated by the enterprise process, the enterprise metadata and the data being stored in one or more data sources;
         a set of service tools comprising a report tool, a configure tool, a define tool, an administrative tool, an analytics and collaborate tool, and a job monitor tool, wherein the set of service tools is configured to perform a set of services on the data;
         wherein the enterprise model couples a plurality of services in the set of services to each other, and wherein the enterprise metadata is integrated with each service tool in the set of service tools; and
         at least one adapter for communicating with the one or more data sources for extracting the enterprise metadata and the data for processing by the set of services,
      wherein the system is configured to,
         determine a service effectiveness index (SEI) for each service in the set of services, based on a set of characteristics corresponding to each service, wherein the set of characteristics include functionality, integration, interoperability, security, collaboration, and adaptability, and wherein the SEI indicates performance level of a corresponding service for defining further improvements to the service;
         analyze the data to determine a set of metrics including a data quality index, a data value index, a data usage index, and a data effectiveness index, wherein the data is managed based on the set of metrics; and
         provide the SEI for one or more services in the set of services and the set of metrics corresponding to the data to stakeholders, based on privileges assigned to the stakeholders.

2. The system of claim 1, wherein the set of services comprises data quality checking, enterprise metadata extraction, data modeling, data security maintenance, data lifecycle management, master data management and governance, and data collaboration.

3. The system of claim 1, wherein the system is further configured to:
   determine a score for each parameter in a set of parameters corresponding to each characteristic in the set of characteristic; and
   compute an index for each characteristic, based on the score for each parameter in a corresponding set of parameters, the index including functionality index, performance index, integration index, interoperability index, security index, and collaboration index;
   determine the service effectiveness index for each service of the set of services, based on the index computed for each characteristic in the set of characteristics.

4. The system of claim 1, wherein the system is configured to analyze the data to determine:
   the data usage index based on a number of hits on a data element, number of hits on dependent processes and a number of hits on dependent objects;
   the data value index based on a criticality index and a number of dependent objects and processes;
   the data quality index based on data quality parameters; and
   the data effectiveness index based on the data usage index, the data value index, and the data quality index.

5. The system of claim 1, wherein the DMA is used to compute an information intelligent quotient of the data source and a data relevance index of the data source.

6. The system of claim 1, further comprising a database for storing the enterprise metadata and the DMA.

7. The system as claimed in claim 1, wherein the system is configured to provide access to a service in the set of services to a stakeholder, based on the privileges assigned to the stakeholder and a data source associated with the service.

8. The system as claimed in claim 1, wherein the system is further configured to compute a performance index indicating performance of the DMA, based on user defined performance index and system defined performance index, and wherein the user defined performance index is determined based on scores provided for each user group for each functional parameter and each non-functional parameter and the system defined performance index is determined based on system parameters and corresponding service level agreement definitions.

9. A method for managing data of an enterprise, the method comprising:
- defining a data management architecture (DMA) to manage the data, the DMA comprising,
  - an enterprise model for analyzing an enterprise process to create and modify enterprise metadata corresponding to the data of the enterprise generated by the enterprise process, the enterprise metadata and the data being stored in one or more data sources;
  - a set of service tools comprising a report tool, a configure tool, a define tool, an administrative tool, an analytics and collaborate tool, and a job monitor tool, wherein the set of service tools is configured to perform a set of services on the data;
  - wherein the enterprise model couples a plurality of services in the set of services to each other, and wherein the enterprise metadata is integrated with each service tool in the set of service tools; and
  - at least one adapter for communicating with the one or more data sources for extracting the enterprise metadata and the data for processing by the set of services,
- triggering one or more service tools from the set of service tools to perform a corresponding service on the data;
- determining a service effectiveness index (SEI) for each service in the set of services, based a set of characteristics corresponding to a service, wherein the set of characteristics include functionality, integration, interoperability, security, collaboration, and adaptability, and wherein the SEI indicates performance level of a corresponding service to define further improvements to the service;
- analyzing the data to determine a set of metrics including a data quality index, a data value index, a data usage index, and a data effectiveness index, wherein the data is managed based on the set of metrics; and
- providing the SEI for one or more services in the set of services and the set of metrics corresponding to the data to stakeholders, based on privileges assigned to the stakeholders.

10. The method of claim 9, wherein the set of services comprises data quality checking, enterprise metadata extraction, data modeling, data security maintenance, data lifecycle management, master data management and governance, and data collaboration.

11. The method of claim 9, wherein determining the SEI comprises:
- determining a score for each parameter in a set of parameters corresponding to each characteristic in the set of characteristic; and
- computing an index for each characteristic, based on the score for each parameter in a corresponding set of parameters, the index including functionality index, performance index, integration index, interoperability index, security index, and collaboration index;
- determining the service effectiveness index for each service of the set of services, based on the index computed for each characteristic in the set of characteristics.

12. The method of claim 9, wherein the data usage index is indicative of a frequency of usage of a data element in the data, and wherein the data usage index is based on a number of hits on the data element, a number of hits on dependent processes and a number of hits on dependent objects, and wherein the dependent processes and dependent objects are associated with the data element.

13. The method of claim 9, wherein the data value index is indicative of a worth of a data element in the data, and wherein the data value index is based on a criticality index of dependent processes and criticality index of dependent objects, and wherein the dependent processes and dependent objects are associated with the data element.

14. The method of claim 9, wherein the data effectiveness index is calculated using the data usage index, the data value index, and the data quality index.

15. The method of claim 9 further comprising computing a data relevance index of a data source from the one or more data sources, based on values of data elements, weights of key words from a master list, and ratings provided for derivation parameters.

16. The method of claim 9, wherein the method further comprises computing an information intelligent quotient of the data source based on a set of derivation parameters.

17. The method as claimed in claim 9, wherein the method further comprises providing access to a service in the set of services to a user, based on the privileges assigned to the stakeholder and a data source associated with the service.

18. The method as claimed in claim 9, wherein the method further comprises computing a performance index indicating performance of the DMA, based on user defined performance index and system defined performance index, and wherein the user defined performance index is determined based on scores provided for each user group for each functional parameter and each non-functional parameter and the system defined performance index is determined based on system parameters and corresponding service level agreement definitions.

19. A non-transitory computer-readable medium having embodied thereon a computer program for executing a method managing data of an enterprise, the method comprising:
- defining a data management architecture (DMA) to manage the data, the DMA comprising,
  - an enterprise model for analyzing an enterprise process to create and modify enterprise metadata corresponding to the data of the enterprise generated by the enterprise process, the enterprise metadata and the data being stored in one or more data sources;
  - a set of service tools comprising a report tool, a configure tool, a define tool, an administrative tool, an analytics and collaborate tool, and a job monitor tool, wherein the set of service tools is configured to perform a set of services on the data;
  - wherein the enterprise model couples a plurality of services in the set of services to each other, and wherein the enterprise metadata is integrated with each service tool in the set of service tools; and
  - at least one adapter for communicating with the one or more data sources for extracting the enterprise metadata and the data for processing by the set of services, triggering one or more service tools from the set of service tools to perform a corresponding service on the data;

determining a service effectiveness index (SEI) for each service in the set of services, based a set of characteristics corresponding to a service, wherein the set of characteristics include functionality, integration, interoperability, security, collaboration, and adaptability, and wherein the SEI indicates performance level of a corresponding service to define further improvements to the service;

analyzing the data to determine a set of metrics including a data quality index, a data value index, a data usage index, and a data effectiveness index, wherein the data is managed based on the set of metrics; and providing the SEI for one or more services in the set of services and the set of metrics corresponding to the data to stakeholders, based on privileges assigned to the stakeholders.

* * * * *